United States Patent [19]

Shuttlewood et al.

[11] Patent Number: 4,728,442
[45] Date of Patent: Mar. 1, 1988

[54] WATER TREATMENT

[75] Inventors: Victor C. Shuttlewood, Tarvin; Roy K. Taylor, Royston, both of England

[73] Assignee: Chlor-Chem Ltd., Great Britain

[21] Appl. No.: 930,984

[22] Filed: Nov. 13, 1986

Related U.S. Application Data

[63] Continuation of Ser. No. 733,992, May 14, 1985, abandoned.

[30] Foreign Application Priority Data

May 17, 1984 [GB] United Kingdom ............... 8412595

[51] Int. Cl.$^4$ ............................................. C02F 1/76
[52] U.S. Cl. .................................. 210/755; 210/764; 422/37
[58] Field of Search ............... 210/755, 764; 422/29, 422/35, 37; 514/241

[56] References Cited

U.S. PATENT DOCUMENTS

| | | | |
|---|---|---|---|
| 3,401,116 | 9/1968 | Stanwood | 210/755 |
| 3,887,468 | 6/1975 | Bray | 210/206 |
| 4,382,862 | 5/1983 | Dillman | 210/755 |
| 4,472,187 | 9/1984 | Wojtowicz | 210/755 |
| 4,498,921 | 2/1985 | Wojtowicz | 210/755 |

FOREIGN PATENT DOCUMENTS 2443000 3/1975 Fed. Rep. of Germany ...... 210/755

OTHER PUBLICATIONS

*Perry's Chemical Engineer's Handbook*, 1963, pp. 21-51.

Primary Examiner—Peter Hruskoci
Attorney, Agent, or Firm—Ostrolenk, Faber, Gerb & Soffen

[57] ABSTRACT

The use in the treatment of swimming pool water of trichloroisocyanuric acid, the mass median particle diameter of which is from 1 to 20 mm.

7 Claims, 1 Drawing Figure

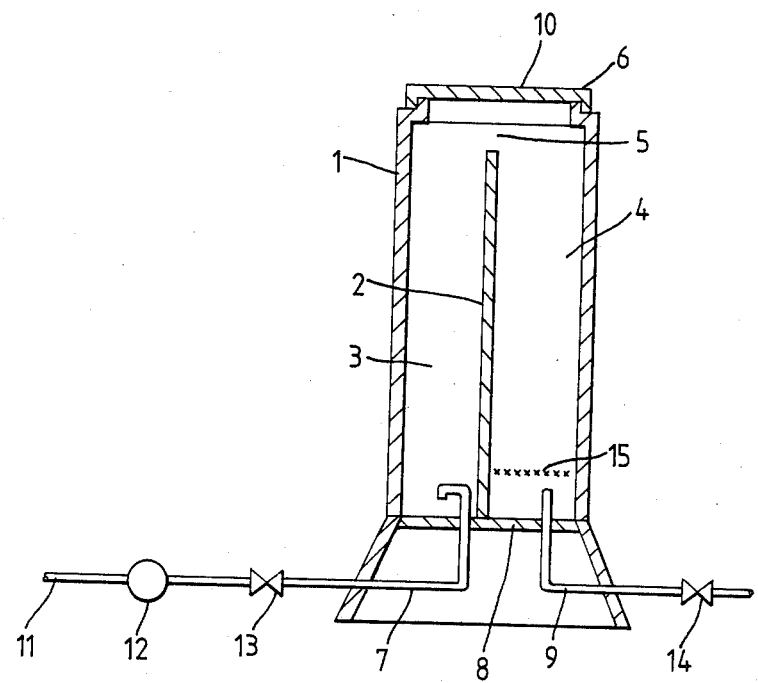

WATER TREATMENT

This is a continuation of Ser. No. 733,992, filed May 14, 1985, now abandoned.

This invention concerns the treatment of swimming pool water to sanitise and disinfect it.

Chlorine has long been used to treat swimming pool water either as a gas, or in the form of compounds which liberate it as hypochlorous acid in the presence of water. Such compounds are growing in importance as the use of hazardous elemental chlorine is being reduced.

Regardless of the means by which it is introduced into the pool, the concentration of chlorine in the water must be maintained within close limits. If it is too low, problems are created through inadequate sanitation and disinfection, and organic matter is incompletely oxidised, leading to the production of lachrymatory chloramines and turbidity in the pool. If it is too high, problems arise through the liberation of chlorine into the atmosphere and again through eye irritation. It follows that the quantity of any chlorine-liberating compound admitted to the pool must be closely controlled.

Trichloroisocyanuric acid is one of the standard chemicals used for sanitising and disinfecting swimming pool water. It is a slowly water-soluble compound which is employed in the form of large tablets weighing about 250 grams each. These are contained stacked in a chlorinator unit, down which the pool water is passed. Gradually, over a period of about a week, the tablets dissolve in the water, reducing in size and eventually disintegrating, the stack of tablets being periodically replenished from the top so as to keep the unit full and able to cope with peak demand. The flow of pool water through the chlorinator unit is then in theory regulated so as to give the optimum concentration in the pool. However, this is by no means easy in practice.

Swimming pool usage is not constant throughout the day, or throughout the week, yet the demand for chemical treatment is dependent very directly on the usage of the pool. If the usage is low, e.g. overnight, it is frequently necessary to stop the pool water passing through the chlorinator unit to prevent an undesirable increase in the concentration of chlorine in the pool. Stopping the flow is undesirable, however, since the trichloroisocyanuric acid continues to dissolve in whatever water is available, giving relatively highly concentrated solutions and thus high chlorine levels in the chlorinator unit. Left in this condition, especially if exposed to the air, the compound has a tendency to decompose to produce lachrymatory chloramines which then circulate into the pool when the water flow is re-commenced, or cause hazardous discomfort when the chlorinator unit is opened, as it must be, for recharging with tablets.

Coping with peak demand is also difficlt. The compound is only slowly water soluble, and the surface area of the large tablets employed is quite small. Even at maximum flow rates through the units, therefore, insufficient compound may be delivered to the pool to maintain a satisfactory chlorine concentration.

We have now found a surprising yet simple way in which the problems associated with the conventional use of trichloroisocyanuric acid may be reduced or substantially overcome.

Accordingly, in one aspect, the invention provides the use in the treatment of swimming pool water of trichloroisocyanuric acid, the mass median particle diameter of which is from 1 to 20 mm.

The mass median particle diameter is that diameter which 50% by weight of the particles of the compound exceed. In other words, it is the sieve mesh size required to retain 50% by weight of the particles.

By the use of such particle size distributions, several advantages are achieved. For example, the particles are much more rapidly soluble (usually about 20 times quicker) than the large tablets used hitherto, which means that the chlorine concentration in the pool can be restored from a low level to an acceptable level far more quickly. However, the particles are not so fine as to dissolve instantaneously, which would produce large sudden increases in chlorine concentration and would necessitate very frequent recharging of the chlorinator unit with tiny amounts of the compound to avoid. Instead, the particles dissolve over a period of hours, which has the effect of smoothing out the peaks and troughs of chlorine concentration, and makes management of the chlorine levels much easier. Being soluble in such a period moreover means that a daily charge of particles calculated on the basis of the expected usage of the pool may be introduced early in the day and will be dissipated by nightfall so there is no need for the circulation system to be shut down overnight to prevent an increase in chlorine levels. However, it can be shut down if desired without problems occurring. In addition, recharging the chlorinator unit with chemical the next day can be performed without risk and without the need for respirators and other protective clothing which at present exists, since no chemical residues remain. Being particulate, the quantity of chemical may also be much more precisely calculated and employed, and there is substantially no chemical decomposition in the chlorinator unit since the residence time of the chemical therein is so short.

A further advantage is that much smaller chlorinator units may be employed since each has only to accommodate a daily charge of chemical rather than large tablets which take a week to dissolve.

The trichloroisocyanuric acid of mass median particle diameter of from 1 to 20 mm is preferably granular material produced by granulation techniques known per se. However, it may be produced by other means if desired, for example prilling or crystallisation. Desirably it is sieved to remove fractions which are above 20 mm or below 1 mm but a proportion of particles of diameters outside these limits does not detract significantly from the performance provided that the mass median diameter remains within the defined range. We do prefer however that the trichloroisocyanuric acid employed contains less than 10% by weight of particles of diameter less than 1 mm, and less than 10% by weight of particles of diameter greater than 20 mm.

Sieving at other limits, for example to remove particles below 2 mm diameter and particles above 6 mm will of course create a mass median particle diameter of what remains somewhere between those limits. By this means, the mass median particle diameter can be adjusted to where it is desired to be. We prefer the trichloroisocyanuric acid to have a mass median particle diameter of from 1 to 10 mm, more preferably 1 to 6 mm, and especially 1.5 to 4 mm. In each case, we prefer less than 10% by weight of the particles to be of a diameter above the upper limit of the specified mass median particle diameter range, and less than 10% by weight of the particles to be of a diameter below the lower limit of the specified mass median particle diameter range.

In another aspect, the invention provides a method of treating swimming pool water with trichloroisocyanuric acid which comprises passing the water through or over a bed of particles thereof as described hereinbefore.

Desirably, the free chlorine concentration in the pool itself is monitored and the quantity of trichloroisocyanuric acid utilised is appropriate to maintain the concentration at between 1 and 5 ppm. In normal usage of a pool of capacity between about 100 and 2500 m$^3$, the usual amount of trichloroisocyanuric acid employed will be from 1 to 15 kg per day, and the flow rate of pool water through the chlorinator unit will be regulated so as to deliver 5 kg of the compound completely in a period of from 30 minutes to 12 hours, preferably in a period of from 1 to 8 hours. Suitable flow rates through the chlorinator unit depend upon the capacity of the pool, but are usually in the range of from 10 to 80 liters per minute.

The trichloroisocyanuric acid is preferably utilised batchwise in a chlorinator unit in such a manner that a charge of the compound therein is completely dissolved and circulated to the pool prior to a new charge being admitted to the chlorinator unit.

One of the reasons why the use of particles of such a mass median diameter has not been considered feasible hitherto may be that they cannot be used satisfactorily in conventional chlorinator units. In such units, small particles are not prevented from being transmitted to the pool still in an undissolved state. This is not a practical problem when tablets are employed since the number of such small particles produced is very small. With granules however, the number of small particles is enormously greater, and special techniques have to be adopted to prevent them reaching the pool undissolved.

We have now found that by the use of a particular, novel form of chlorinator unit, the problems set out above may be overcome or at least significantly reduced.

Accordingly, in another aspect, this invention provided a chlorinator unit for use in the water circulation system of a swimming pool, which unit comprises a housing having two communicating chambers therein, an inlet for untreated pool water into the first of said chambers and an outlet for treated pool water from the second of said chambers, the arrangement of the chambers being such that, in use, pool water from the inlet substantially fills the first chamber before flowing into the second chamber.

In use, trichloroisocyanuric acid of the desired mass median particle diameter is placed in the first chamber. Water from the pool flows into the first chamber through the inlet, which is conveniently located at or near the base of the chamber. The chamber then fills up, slowly dissolving the compound, and overflows, conveniently near the top of the chamber, into the second chamber where, it desired, a neutralising median, for example limestone, dolomitic limestone or granular Akdolit, is contained. Such a medium may have the advantages, if chosen appropriately, of neutralising the acidity of the trichloroisocyanuric acid, of retaining any particles of the acid swept into the second chamber until they are dissolved, of removing some of the cyanuric acid which is a product of the use of trichloroisocyanuric acid employed, of destabilising any chloramines which may be present, and of scavenging any copper or iron salts which would otherwise discolour the pool water and the pool equipment and surrounds.

Having a construction where the outlet from the first chamber is near its top means that there is little tendency at normal pool water flow rates to carry particles of the acid into the second chamber.

In normal usage, the particulate trichloroisocyanuric acid is dissolved within a period of hours, and the amount used is only that calculated to be sufficient for the day's use. Consequently, there should be little need to halt the flow of pool water through the chlorinator unit for example to cope with very low pool usage. If it is halted, however, the first chamber of the unit remains full of water, and any trichloroisocyanuric acid present stays submerged. There is thus a much reduced tendency for lachrymatory chloramines to be produced.

The outlet from the second chamber is desirably located at or near the base thereof so that water passing through the second chamber has to pass through any neutralising medium therein.

The chlorinator unit is preferably provided with a removable cap through which trichloroisocyanuric acid may be charged into the first chamber, and neutralising medium into the second chamber.

In another aspect, the invention provides a method of sanitising swimming pool water which comprises passing the water through a chlorinator unit of the invention suitably charged with trichloroisocyanuric acid in the form defined hereinbefore.

BRIEF DESCRIPTION OF THE DRAWING

The chlorinator unit of the invention is further described, though only by way of illustration, with reference to the accompanying drawing which shows a cross section through a chlorinator unit in accordance with the invention.

The chlorinator unit comprises a generally cylindrical housing 1 divided by an internal partition 2 into two watertight chambers 3 and 4 which intercommunicate at the upper part of each via a gap 5 provided where the partition 2 falls short of the top 6 of the housing 1. A water inlet 7 is provided through the base 8 of the housing chamber 3, and a water outlet 9 is provided through the base of the housing from chamber 4.

In use, cap 10 is removed from the top of the housing, and sufficient trichloroisocyanuric acid granules are charged into chamber 3 to sanitise the pool water for one day. If desired, a neutralising medium may be charged in a similar way into chamber 4. Water from the pool is then pumped into chamber 3 through inlet pipe 11 via flow meter 12 and valve 13. The level of water builds up in chamber 3, slowly dissolving the trichloroisocyanuric acid granules, and when it reaches the level of gap 5, overflows into chamber 4, passes through any neutralising medium therein, and leaves the housing 1 via grating 15 provided to retain coarse particles through outlet 9 to the pool (not shown).

Control of the rate of discharge of trichloroisocyanuric acid into the pool is achieved by adjusting the flow rate of water into chamber 3. If it is desired to halt the flow, valves 13 and 14 are closed. Chamber 3 remains filled with pool water and cannot drain away, thereby ensuring that any trichloroisocyanuric acid remains submerged.

The treatment of swimming pool water in accordance with the invention is further described in the following Example.

EXAMPLE

A pool of 1300 m$^3$ capacity which had been well used by bathers was found to have a free chlorine concentration of just under 1 ppm, which is below recommended limits. After use, and cleared of bathers, the two existing tablet chlorination units, each fully charged with 13 kg of 250 g tablets of trichloroisocyanuric acid, were used at a flow rate of 60 liters per minute to boost the chlorine concentration in the pool to 5 ppm. This took a period of 5 hours to achieve.

During further pool usage, the tablet chlorination units were replaced with a single chlorination unit of the invention as described with reference to the drawing and having a capacity of 15 kg. 5 kg of granular trichloroisocyanuric acid, having been sieved to ensure less than 10% by weight in particles less than 1.5 mm diameter and less than 10% by weight in particles greater than 4 mm diameter, were then charged into the first chamber thereof. After pool usage, and again cleared of bathers, the unit was used at a flow rate of 60 liters per minute to pass dissolved compound to the pool. An increase in the concentration of free chlorine of from less than 1 ppm to 5 ppm in the pool was achieved in just 30 minutes.

We claim:

1. In a method of sanitizing and disinfecting swimming pool water by adding an effective sanitizing and disinfecting amount of a sanitizing and disinfecting agent to the water, the improvement which comprises passing the water through or over a bed of said agent consisting of particles of trichloroisocyanuric acid having a mass median particle diameter of from 1 to 20 mm, not more than 10% by weight of which consists of particles of a diameter above the upper limit of the specified mass median particle diameter range, and not more than 10% by weight of which consists of particles of a diameter below the lower limit of the specified mass median particle diamerter range, said bed being contained in a chlorinator unit through which the water is passed, and thereby smoothing out variations in chlorine concentration in said swimming pool water as the particles dissolve and wherein the flow rate of the water is such as to dissolve 5 kg of the trichloroisocyanuric acid over a period of from 30 minutes to 12 hours.

2. The method according to claim 1 in which the mass median particle diameter is from 1 to 6 mm.

3. The method according to claim 2 in which the mass median particle diameter is from 1.5 to 4 mm.

4. A method according to claim 1 wherein the trichloroisocyanuric acid is utilised in a chlorinator unit in such a manner that a charge of the acid therein is completely dissolved and circulated to the pool prior to a new charge being admitted into said unit.

5. The method according to claim 1 wherein the chlorinator unit contains 1 to 15 kg of acid for each about 100–2500 m$^3$ of pool water.

6. In a method of sanitizing and disinfecting swimming pool water by adding an effective sanitizing and disinfecting amount of a sanitizing and disinfecting agent to the water, the improvement which comprises passing the water through or over a bed of said agent consisting of particles of trichloroisocyanuric acid having a mass median particle diameter of from 1 to 20 mm, said bed being contained in a chlorinator unit through which the water is passed, and thereby smoothing out variations in chlorine concentration in said swimming pool water as the particles dissolve and wherein the flow rate of the water is such as to dissolve 5 kg of the trichloroisocyanuric acid over a period of from 30 minutes to 12 hours.

7. The method according to claim 6 wherein the chlorinator unit contains 1 to 15 kg of acid for each about 100–2500 m$^3$ of pool water.

* * * * *